United States Patent

Nakashio et al.

[11] Patent Number: 5,908,911
[45] Date of Patent: Jun. 1, 1999

[54] RESIN COMPOSITION FOR CATIONIC ELECTRODEPOSITION COATING

[75] Inventors: Masaaki Nakashio; Junko Kawashima; Shoichiro Arakura, all of Amagasaki, Japan

[73] Assignee: Shinto Paint Co., Ltd., Hyogo-ken, Japan

[21] Appl. No.: 08/862,163

[22] Filed: May 22, 1997

[30] Foreign Application Priority Data

Jun. 12, 1996 [JP] Japan .................................. 8-174315

[51] Int. Cl.$^6$ .................................................. C08G 18/10
[52] U.S. Cl. ............................ 528/45; 528/60; 525/453; 525/528; 524/904
[58] Field of Search ........................ 528/45, 60; 525/528, 525/453; 524/904

[56] References Cited

U.S. PATENT DOCUMENTS

| | | | |
|---|---|---|---|
| 4,755,418 | 7/1988 | DeBroy et al. | 428/215 |
| 5,070,149 | 12/1991 | DeBroy et al. | 525/296 |
| 5,461,091 | 10/1995 | Hoffmann et al. | 523/415 |
| 5,594,049 | 1/1997 | Yamada | 523/415 |

*Primary Examiner*—Rachel Gorr
*Attorney, Agent, or Firm*—Wenderoth, Lind & Ponack L.L.P.

[57] ABSTRACT

Disclosed herein is a resin composition for cationic electrodeposition coating containing (A) an epoxy resin (a base resin) having cationic groups and (B) a blocked polyisocyanate (a curing agent), characterized in that, a blocked polyisocyanate (B) in which a part of the isocyanate groups is polymerized with a polyol and which is blocked by (1) a blocking agent represented by a formula R—$(OC_2H_3X)_n$—OH (wherein R is an alkyl having 1–6 carbon atom(s); X is H or methyl; and n is 1–6) and having a molecular weight of not less than 150 and also by (2) another blocking agent having a deblocking temperature of not higher than about 150° C. is used.

10 Claims, No Drawings

RESIN COMPOSITION FOR CATIONIC ELECTRODEPOSITION COATING

BACKGROUND OF THE INVENTION

The present invention relates to a novel resin composition for cationic electrodeposition coating and, more particularly, it relates to a resin composition for cationic electrodeposition coating which exhibits prominent properties in higher film building, curing process and retaining film building during the operation, has little heating loss, exhibits excellent smoothness and physical properties and shows good chemical performance in terms of corrosion resistance and solvent resistance.

As compared with air spraying and electrostatic spraying, an electrodeposition has better throwing power and results in less environmental pollution when applied to materials having recessed area such as automobiles and electric devices and, therefore, it has been widely put to practical use as a primer coating. However, various kinds of solvents are used therefor with an object of assuring the workability, particularly film thickness of the coating, at a coating job site.

[Problems to be Solved by the Invention]

When, however, the recent trend in environmental regulation is taken into consideration, it is desired that the amount of organic solvents in the electrodeposition coating is as little as possible (i.e. making a VOC lower).

In view of the above, the present inventors have conducted an intensive study for developing a resin composition for cationic electrodeposition coating which can be well baked at the temperature of 150–170° C., exhibits prominent properties in higher film building and retaining film building during the operation, has little heating loss, exhibits excellent smoothness and physical properties and shows good chemical performance in terms of corrosion resistance and solvent resistance. It has been found that said objects can be achieved by the use of a blocked polyisocyanate in which a part of isocyanate groups is polymerized with a polyol and which is simultaneously blocked by two kinds of blocking agents, i.e. (1) a blocking agent represented by a formula R—$(OC_2H_3X)_n$—OH (wherein R is an alkyl having 1–6 carbon atom(s); X is H or methyl; and n is 1–6) and having a molecular weight of not less than 150 and (2) another blocking agent having a deblocking temperature of not higher than about 150° C.

Thus, the present invention relates to a resin composition for cationic electrodeposition coating containing (A) an epoxy resin (a base resin) having cationic groups and (B) a blocked polyisocyanate (a curing agent), characterized in that, a blocked polyisocyanate in which a part of the isocyanate groups is polymerized with a polyol and which is blocked by (1) a blocking agent represented by a formula R—$(OC_2H_3X)_n$—OH (wherein R is an alkyl having 1–6 carbon atom(s); X is H or methyl; and n is 1–6) and having a molecular weight of not less than 150 and (2) another blocking agent having a deblocking temperature of not higher than about 150° C. is used.

DETAILED DESCRIPTION OF THE INVENTION

The epoxy resin (A) having cationic groups used as a base resin in the present invention is prepared by introducing amino groups into an epoxy resin followed by protonizing said amino groups with an acid. Particularly preferred acid includes formic acid, acetic acid, lactic acid, propionic acid, citric acid, malic acid, sulfamic acid and the like. There is no particular limitation for the numbers of the amino group but, usually, 0.5–3 equivalents are suitable to 1,000 g of the resin.

With respect to the epoxy resin, which preferably has two epoxy groups in average per molecule and its molecular weight is preferably 400–7,000 or, particularly preferably, 400–4,000. To be more specific, one example is a glycidyl ether of polyphenol having two phenolic hydroxyl groups in a molecule and preferred examples of the polyphenol are resorcinol, hydroquinone, 2,2-bis(4-hydroxyphenyl)-propane (the so-called bisphenol A), 4,4'-dihydroxybenzophenone, 1,1-bis(4-hydroxy-phenyl)-methane, 1,1-bis(4-hydroxyphenyl)-ethane, 4,4'-dihydroxy-biphenyl and the like. Another is a glycidyl ether of diol having two alcoholic hydroxyl groups in a molecule. Preferred examples of the diol are low-molecular diols, such as, ethylene glycol, propylene glycol, 1,4-butanediol, 1,6-hexanediol, neopentyl glycol, diethylene glycol, triethylene glycol, 1,4-cyclohexanediol, etc. and oligomer diols such as polyethylene glycol, polypropylene glycol, polytetramethylene glycol, etc. The present invention is not limited to those mentioned above, but a mixture of the above-mentioned epoxy resins may be used as well.

In order to afford a preferred molecular weight, the above-mentioned epoxy resin is used as a polymerizing agent to design a high molecular weight. Preferred polymerizing agents include the above-mentioned polyphenols and diols and further examples are dicarboxylic acids having two carboxyl groups in a molecule including adipic acid, azelaic acid, sebacic acid, tetrahydrophthalic anhydride, hexahydrophthalic anhydride and isophthalic acid as well as dimeric acids, carboxyl-containing butadiene polymer or butadiene/acrylonitrile copolymers, etc. Examples of the amine are primary amines such as ethylamine, n-propylamine, isopropylamine, n-butylamine, isobutylamine, monoethanolamine, dimethylaminopropylamine and diethylaminopropylamine and diamines where each of the amino groups in hexamethylenediamine is secondary. Extension of the chain using polyisocyanate is possible as well.

Particularly preferred means for achieving a high molecular weight is a method wherein glycidyl ether of the above-mentioned polyphenol is polymerized with glycidyl ether of the above-mentioned diol using the above-mentioned polyphenol and a suitable reaction temperature therefor is 70–180° C.

Examples of an aminating agent which aminates the epoxy groups of the above-mentioned epoxy resin are methylamine, ethylamine, n-propylamine, isopropylamine, monoethanolamine, n-propanolamine, isopropanolamine, diethylamine, diethanolamine, N-methylethanolamine, N-ethylethanolamine, ethylenediamine, diethylenetriamine, hydroxyethylaminoethylamine, ethylaminoethyl-amine, methylaminopropylamine, dimethylaminopropylamine and a mixture thereof. Among these amines, particularly preferred ones are alkanolamines having a hydroxyl group. It is also possible that a primary amine is previously reacted with a ketone for blocking and then the residual active hydrogens are reacted with epoxy groups. A specific method for the amination is that the reaction is usually conducted at the temperature of 50–120° C. in the presence or absence of a solvent.

The blocked polyisocyanate (B) used for the curing agent resin of the present invention achieves its effect when 5–55% or, preferably, 10–30% of the isocyanate groups are polymerized with the polyol while residual isocyanate groups are blocked by the two kinds of blocking agents. Alternatively, a polymerizing reaction by the polyol may be conducted after the blocking or the reactions may be conducted simultaneously wherein there is no particular limitation as to the order of the reactions.

Preferred polymerizing agents are the diols having two hydroxyl groups per molecule including low-molecular diols, such as, ethylene glycol, propylene glycol, 1,6-hexanediol, neopentyl glycol, diethylene glycol, triethylene glycol, 1,4-cyclohexane-diol, etc. and oligomer diols such as polyethylene glycol, polypropylene glycol, polytetramethylene glycol, polylactone diol, etc. although the present invention is not limited thereto.

The polyisocyanate of the present invention is aromatic or aliphatic (including alicyclic) polyisocyanate and examples are 2,4- or 2,6-tolylene diisocyanate or a mixture thereof, p-phenylene diisocyanate, diphenylmethane-4,4'-diisocyanate, polymethylene polyphenyl isocyanate, tetramethylene diisocyanate, hexamethylene diisocyanate, isophorone diisocyanate, cyclohexylmethane-4,4'-diisocyanate, m- or p-xylylene diisocyanate and a compound of a biuret type or an isocyanurate type modified from the above-mentioned isocyanates although the present invention is not limited thereto.

The reaction of the polyisocyanate with a polymerizing agent and an blocking agent may be conducted in a solvent or in a melted state without a solvent. There is no particular limitation as to the reaction temperature but, preferably, it is 30–150° C. Examples of the solvent used in the reaction are those which do not react with the polyisocyanate including ketones. such as, acetone, methyl ethyl ketone, methyl isobutyl ketone, cyclopentanone, cyclohexanone and isophorone; aromatic hydrocarbons, such as, benzene, toluene, xylene, chlorobenzene and nitrobenzene; cyclic ethers, such as, tetrahydrofuran and dioxane; and halogenated hydrocarbons such as chloroform and carbon tetrachloride.

The blocking agent (1) which reacts with the isocyanate group of the above-mentioned polyisocyanate is represented by a formula R—$(OC_2H_3X)_n$—OH (in which R is an alkyl group having 1–6 carbon atom(s); X is H or methyl; and n is 1–6) having a molecular weight of not less than 150 and is used for ensuring the coating ability. Accordingly, for example, when R is methyl, ethyl, n-propyl and isopropyl, n is 3 or more while, when R is n-butyl, isobutyl or tert-butyl, n is 2 or more although that will be limited by the molecular weight.

Specific examples are ethylene glycol monohexyl ether, diethylene glycol monobutyl ether, propylene glycol monobutyl ether, etc. and, preferably, triethylene glycol monomethyl ether, triethylene glycol monoethyl ether, triethylene glycol monopropyl ether and triethylene glycol monobutyl ether. Those which are not within the coverage of the above-mentioned formula and molecular weight have little coating ability and are not preferred.

The blocking agent (2) which reacts with the isocyanate group of the above-mentioned polyisocyanate in the present invention has a deblocking temperature of not higher than 150° C. and is used for adjusting the curing property.

Specific examples are tertiary hydroxylamines, such as, diethylethanolamine and dimethylethanolamine; oxime compounds, such as, acetone oxime, methyl ethyl ketone oxime and cyclohexanone oxime; and lactam compounds such as ε-caprolactam and, among them, lactam compounds are particularly preferred. Compounds having a deblocking temperature of higher than 150° C. have poor curing property for the coating and are not preferred.

In the present invention, the proportion of the blocking agent (1) occupying in the total amounts of the blocking agents (1) and (2) is 10–60% by weight or, preferably, 15–50% by weight.

In the present invention, the compounding ratio by weight of the resin (a base resin) having cationic groups (A) to the blocked polyisocyanate (a curing agent) (B) is 90-40/10-60, preferably 85-50/15-50 or, more preferably, 80-55/20-45.

The resin composition for cationic electrodeposition coating in accordance with the present invention may, if necessary, contain additives which are common to coating products including coloring pigments such as titanium white, carbon black, red iron oxide and chrome yellow; body pigments such as kaolin, talc, calcium carbonate, mica, clay and silica; anticorrosive pigments such as strontium chromate, zinc chromate, lead silicate, basic lead silicate, lead chromate, basic lead chromate, lead phosphate, red lead, lead cyanamide, lead zincate, lead sulfate, basic lead sulfate, aluminum phosphomolybdate, aluminum tripolyphosphate, zinc phosphate, zinc phosphite, zinc cyanide and zinc oxide; defoamers; anti-cratering agents; and curing catalysts.

The composition of the present invention for cationic electrodeposition coating is neutralized with an acid and, usually, it is subjected to an electrodeposition in a state of being dispersed in water. In addition, it is also possible to use, if necessary, together with an organic solvent, such as, isopropanol, n-butanol, isobutanol, 2-ethylhexanol, methyl cellosolve, ethyl cellosolve, butyl cellosolve, hexyl cellosolve, methoxypropaol, phenoxypropanol, butyl carbitol, isophorone, toluene and xylene The resin composition of the present invention for electrodeposition coating can be applied to the surface of the desired material by a known cationic electrodeposition coating means. To be more specific, the solid concentration of the coating is adjusted preferably to about 5–40% or, more preferably, to 15–25% by weight and the pH is adjusted to 5–8 depending upon the amount of the acid used whereby a coating can be conducted using a material to be applied as a cathode under the conditions of a bath temperature of 15–35° C. and a loading voltage of 100–450 volts although the present invention is not limited to those conditions only. There is no particular limitation as to the thickness of the coating prepared from the resin composition of the present invention but, in terms of a cured coating, it is suitably 5–60 μm or, preferably, 10–40 μm.

EXAMPLES

The present invention will be illustrated more specifically by way of the following manufacturing examples and examples although the present invention is not limited thereto.

Manufacture of a Blocked Polyisocyanate (B)

Manufacturing Example 1

(Manufacture of a Curing Agent B1)

The materials shown in Table 1 were used and, by means of a method as given below, a blocked polyisocyanate was manufactured.

TABLE 1

| Materials Used | Compositions for B1 | for B2 |
|---|---|---|
| | (Parts by Weight) | |
| (1) Polymethylenepolyphenyl isocyanate | 280 | 280 |
| (2) Methyl isobutyl ketone | 206 | 205 |
| (3) P-400 | 60 | 60 |
| (4) $\epsilon$-Caprolactam | 90 | 90 |
| (5) Ethylene glycol monohexyl ether | 187 | |
| (6) Triethylene glycol monobutyl ether | | 185 |
| Total | 823 | 820 |

To the material (1), i.e. Millionate MR-400 (manufactured by Nippon Polyurethane Industry Co., Ltd.), in a three-liter four-necked flask equipped with a stirrer, a thermometer and a condenser were added the materials (2) and (3) (polypropylene glycol; manufactured by Asahi Denka Kogyo KK) and the mixture was stirred, heated up to 100° C. and kept at that temperature for one hour. After that, a mixture of the materials (4) and (5) was dropped thereinto during one hour keeping the temperature in the flask at 100° C., the temperature was kept at 100° C. for two hours after completion of the dropping followed by cooling down to 80° C. and the product was taken out. Solid content of the resulting blocked polyisocyanate B1 was 75%.

Manufacturing Example 2

(Manufacture of a Curing Agent B2)

The materials shown in Table 1 were used and, by means of a method as given below, a blocked polyisocyanate was manufactured.

To the material (1), i.e. Millionate MR-400 (manufactured by Nippon Polyurethane Industry Co., Ltd.), in a three-liter four-necked flask equipped with a stirrer, a thermometer and a condenser were added the materials (2) and (3) (polypropylene glycol; manufactured by Asahi Denka Kogyo KK) and the mixture was stirred, heated up to 100° C. and kept at that temperature for one hour. After that, a mixture of the materials (4) and (6) was dropped thereinto during one hour keeping the temperature in the flask at 100° C., the temperature was kept at 100° C. for two hours after completion of the dropping followed by cooling down to 80° C. and the product was taken out. Solid content of the resulting blocked polyisocyanate B2 was 75%.

Manufacturing Example 3

(Manufacture of a Curing Agent B3)

The materials shown in Table 2 were used and, by means of a method as given below, a blocked polyisocyanate was manufactured.

TABLE 2

| Materials Used | Composition for B3 (Parts by Weight) |
|---|---|
| (1) Polymethylenepolyphenyl isocyanate | 280 |
| (2) Methyl isobutyl ketone | 193 |
| (3) P-400 | 60 |
| (4) $\epsilon$-Caprolactam | 136 |
| (5) Triethylene glycol monobutyl ether | 103 |
| Total | 772 |

To the material (1), i.e. Millionate MR-400 (manufactured by Nippon Polyurethane Industry Co., Ltd.), in a three-liter four-necked flask equipped with a stirrer, a thermometer and a condenser were added the materials (2) and (3) (polypropylene glycol; manufactured by Asahi Denka Kogyo KK) and the mixture was stirred, heated up to 100° C. and kept at that temperature for one hour. After that, a mixture of the materials (4) and (5) was dropped thereinto during one hour keeping the temperature in the flask at 100° C., the temperature was kept at 100° C. for two hours after completion of the dropping followed by cooling down to 80° C. and the product was taken out. Solid content of the resulting blocked polyisocyanate B3 was 75%.

Manufacturing Example 4

(Manufacture of a Curing Agent B4 using a Low-Molecular Blocking Agent for Comparison)

The materials shown in Table 3 were used and, by means of a method as given below, a blocked polyisocyanate was manufactured.

TABLE 3

| Materials Used | Compositions for B4 | for B5 |
|---|---|---|
| | (Parts by Weight) | |
| (1) Polymethylenepolyphenyl isocyanate | 280 | 280 |
| (2) Methyl isobutyl ketone | 179 | 207 |
| (3) P-400 | 60 | 60 |
| (4) $\epsilon$-Caprolactam | 90 | |
| (5) Ethylene glycol monobutyl ether | 106 | 94 |
| (6) Triethylene glycol monobutyl ether | | 185 |
| Total | 715 | 826 |

To the material (1), i.e. Millionate MR-400 (manufactured by Nippon Polyurethane Industry Co., Ltd.), in a three-liter four-necked flask equipped with a stirrer, a thermometer and a condenser were added the materials (2) and (3) (polypropylene glycol; manufactured by Asahi Denka Kogyo KK) and the mixture was stirred, heated up to 100° C. and kept at that temperature for one hour. After that, a mixture of the materials (4) and (5) was dropped thereinto during one hour keeping the temperature in the flask at 100° C., the temperature was kept at 100° C. for two hours after completion of the dropping followed by cooling down to 80° C. and the product was taken out. Solid content of the resulting blocked polyisocyanate B4 was 75%.

Manufacturing Example 5

(Manufacture of the Curing Agent B5 using a Blocking Agent of a High-Temperature Deblocking Type for Comparison)

The materials as shown in Table 3 were used and, by means of a method as shown below, a blocked polyisocyanate was manufactured.

To the material (1), i.e. Millionate MR-400 (manufactured by Nippon Polyurethane Industry Co., Ltd.), in a three-liter four-necked flask equipped with a stirrer, a thermometer and a condenser were added the materials (2) and (3) (polypropylene glycol; manufactured by Asahi Denka Kogyo KK) and the mixture was stirred, heated up to 100° C. and kept at that temperature for one hour. After that, a mixture of the materials (5) and (6) was dropped thereinto during one hour keeping the temperature in the flask at 100° C., the temperature was kept at 100° C. for two hours after completion of the dropping followed by cooling down to 80°

C. and the product was taken out. Solid content of the resulting blocked polyisocyanate B5 was 75%.

Manufacturing Example 6

(Base Resin A)

The materials as shown in Table 4 were used and, by means of a method as shown below, an epoxy resin modified by a cationic amine (A) of the present invention was manufactured.

TABLE 4

| Materials Used | Compositions (Parts by Weight) |
| --- | --- |
| (1) PP-300P | 182 |
| (2) Bisphenol A | 263 |
| (3) Tributylamine | 0.4 |
| (4) Methyl isobutyl ketone | 29 |
| (5) Bisphenol A diglycidyl ether (epoxy equivalent: 187) | 505 |
| (6) Methyl isobutyl ketone | 417 |
| (7) Diethanolamine | 91 |
| Total | 1487.4 |

The materials (1) (polyoxypropylene glycol ether; manufactured by Sanyo Chemical Industries, Ltd.), (2), (3) and (4) were charged in a two-liter four-necked flask equipped with a stirrer, a thermometer and a condenser and the mixture was heated with stirring up to 150° C. and kept at that temperature for about three hours. The resulting initial condensate contained about 94% of solid matters and almost no residual epoxy group. Then, the material (5) was added thereto and the mixture was heated up to 150° C. and kept at that temperature for about two hours whereby its solid content and epoxy equivalent were found to be 97% and 950, respectively.

After that, this was cooled down to about 110° C., the material (6) was added thereto for dilution and dissolution followed by cooling down to about 80° C.

The material (7) was added thereto paying attention to heat generation and the mixture was heated up to 100° C. and kept at that temperature for two hours to give an epoxy base resin (A) modified with a cationic amine containing 0.83 milliequivalent of tertiary amino group per gram of the solid. The solid content was about 70%.

Manufacturing Example 7

(Manufacture of Resin A for Pigmentation)

The materials as shown in Table 5 were used and, by means of a method as shown below, an epoxy resin modified by an amine for comparison was manufactured.

TABLE 5

| Materials Used | Compositions (Parts by Weight) |
| --- | --- |
| (1) Bisphenol A diglycidyl ether (epoxy equivalent: 187) | 748 |
| (2) Bisphenol A diglycidyl ether (epoxy equivalent: 475) | 950 |
| (3) Propylene glycol monomethyl ether | 932 |
| (4) Diethylaminopropylamine | 260 |
| (5) Diethanolamine | 210 |
| Total | 3100 |

The materials (1) [Epotohto YD-128; manufactured by Tohto Kasei Co., Ltd.), (2) [Epotohto YD-011; manufactured by Tohto Kasei Co., Ltd.) and (3) were charged in a five-liter four-necked flask equipped with a stirrer, a thermometer and a condenser and the mixture was heated with stirring up to 100° C. This was kept at 100° C. for one hour and cooled down to 80° C. Then, the materials (4) and (5) were added thereto and the mixture was heated up to 100° C. After keeping at 100° C. for two hours, the mixture was cooled down to 80° C. and taken out. Solid content of the resulting resin A for pigmentation was 70%.

Manufacturing Example 8

(Preparation of a Pigment Paste)

Resin A for pigmentation, formic acid, deionized water, diethylene glycol monobutyl ether, carbon black, titanium oxide, kaolin, dibutyl tin oxide and anticorrosive pigment were well stirred by a dissolver and then ground by a horizontal sand mill until the gage particle size became not larger than 10 $\mu$m to give a pigment paste containing 50% of solids.

Examples 1–3 and Comparative Examples 1–2

Each of the resins and the solvents according to the compounding as shown in Table 6 were charged in a two-liter four-necked flask equipped with a stirrer, a thermometer, a condenser and a vacuum device. Since the NCO values vary depending upon the type of the curing agent resins used (A–D), the compounding ratio by weight was controlled so as to make the ratio of (OH of the base resin)/(NCO of the curing agent resin) constant. After that, a predetermined amount of the solvent was removed at 90° C. under the pressure of 50–60 mmHg and the resin solution wherefrom the solvent was partially removed was emulsified by gradually adding, with stirring, to a cylindrical container made of stainless steel wherein deionized water and formic acid were charged whereupon a resin emulsion containing about 35% of solids was prepared. To this were added predetermined amounts of deionized water and a pigment dispersion to give a solution for an electrodeposition coating bath.

TABLE 6

Preparation of Cationic Electrodeposition Coating and Evaluation of the Coating (Amounts of the Materials are in Parts by Weight)

| | Examples | | | Comp. Ex. | |
| --- | --- | --- | --- | --- | --- |
| | 1 | 2 | 3 | 1 | 2 |
| Composition of Electrodeposition Coating Bath Liquid | | | | | |
| Composition of Emulsified Resin Liquid | | | | | |
| Base Resin A | 484 | 484 | 484 | 527 | 484 |
| Curing Agent B1 | | 287 | | | |
| Curing Agent B2 | | | 287 | | |
| Curing Agent B3 | | | 287 | | |
| Curing Agent B4 | | | | 246 | |
| Curing Agent B5 | | | | | 287 |
| Butyl Cellosolve | 31 | 31 | 31 | 92 | 31 |
| Solvent Removal | −154 | −154 | −154 | −154 | −154 |
| Deionized Water | 926 | 926 | 926 | 863 | 926 |
| Formic Acid | 9 | 9 | 9 | 9 | 9 |
| Subtotal (NV = 35%) | 1583 | 1583 | 1583 | 1583 | 1583 |
| Deionized Water | 1925 | 1925 | 1925 | 1925 | 1925 |
| Pigment Dispersion | 492 | 492 | 492 | 492 | 492 |
| Total | 4000 | 4000 | 4000 | 4000 | 4000 |

TABLE 6-continued

Preparation of Cationic Electrodeposition Coating and Evaluation
of the Coating (Amounts of the Materials are in Parts by Weight)

|  | Examples | | | Comp. Ex. | |
| --- | --- | --- | --- | --- | --- |
|  | 1 | 2 | 3 | 1 | 2 |
| Quality of the Coating | | | | | |
| Solvent Amount (wt %) | 2.3 | 2.3 | 2.3 | 4.0 | 2.3 |
| Thickness of the Coating | | | | | |
| 200V ($\mu$m) | 25 | 26 | 21 | 20 | 28 |
| 250V ($\mu$m) | 32 | 34 | 28 | 26 | 37 |
| 300V ($\mu$m) | 41 | 45 | 38 | 33 | 48 |
| Quality of the Coated Film | | | | | |
| Salt Spray Test (mm) | 2.0 | 2.0 | 1.9 | 2.0 | 2.1 |
| Curing Temperature (° C.) | 170 | 170 | 150 | 170 | 180 |
| Heating Loss (%) | 8.2 | 8.1 | 7.6 | 8.5 | 8.9 |
| Impact Resistance (cm) | 50 | 50 | 40 | 30 | 50 |
| Erichsen Resistance (mm) | 7 | 7 | 6 | 6 | 7 |

Method for Preparing a Test Plate

Electrodeposition coating was conducted using the above-prepared solution for the electrodeposition coating wherein a carbon electrode was used as an anode while a plate treated with zinc phosphate (0.8×70×150 mm; Bt 3004 manufactured by Nippon Test Panel Co., Ltd.) was used as a cathode under the condition that the thickness of the coated film after baking became 20 $\mu$m followed by baking at 170° C. for 20 minutes. Results of the evaluation of the chemical performance is shown in Table 5.

Method of Evaluation (1) Solvent Amount: Bath liquid was prepared and then the measurement was conducted by means of a gas chromatographic analysis. (2) Thickness of the Electrodeposited Film: After preparing the bath liquid, it was subjected to an open stirring for one hour and subjected to an electrodeposition under a predetermined coating condition followed by baking and the thickness of the film was measured. (3) Resistance against Spraying of Saline Solution: This was conducted in accordance with JIS-Z-2731. Thus, scratches reaching to the base material were prepared on the electrodepositedly coated surface using a cutter and the width of the rust after 1,000 hours was evaluated. (4) Curing Temperature: A baking was conducted for 20 minutes at each baking temperature followed by dipping in acetone at 40° C. for 24 hours to determine a gel fraction. The condition for giving a gel fraction of not less than 98% is shown in the Table. (5) Heating Loss: A loss in weight (%) of the film after baking at 170° C. for 20 minutes as compared with the film weight after drying at 105° C. for three hours was determined. (6) Impact Test: A DuPont tester (½ inch; 1 kg) was used and a dropped distance (cm) is shown in the Table. (7) Erichsen test: A deforming distance resulting in a cracking in the test plate is shown in the Table.

[Merit of the Invention]

In accordance with the present invention, a resin having a cationic group is used as a base resin while, as a curing agent, a blocked polyisocyanate wherein a part of isocyanate groups is polymerized with a polyol and which is blocked by (1) a blocking agent represented by a formula R—$(OC_2H_3X)_n$—OH (wherein R is an alkyl having 1–6 carbon atom(s); X is H or methyl; and n is 1–6) and having a molecular weight of not less than 150 and also by (2) another blocking agent having a deblocking temperature of not higher than about 150° C. is used whereby it is now possible to offer a resin composition for cationic electrodeposition coating which can be well baked at the temperature of 150–170° C., exhibits prominent properties in higher film building and retaining film building during the operation, has little heating loss upon baking, exhibits excellent smoothness and physical properties and shows good chemical performance in terms of corrosion resistance, solvent resistance and the like.

What is claimed is:

1. A resin composition for cationic electrodeposition coating comprising (A) an epoxy resin (a base resin) having cationic groups and (B) a blocked polyisocyanate (a curing agent), wherein the blocked polyisocyanate (B) has a plurality of isocyanate groups, wherein a first portion of the isocyanate groups are polymerized with a polyol and a second portion of isocyanate groups are blocked by (1) a first blocking agent represented by a formula R—$(OC_2H_3X)_n$—OH wherein R is an alkyl having 1–6 carbon atom(s); X is H or methyl; and n is 1–6 and having a molecular weight of not less than 150 and (2) a second blocking agent having a deblocking temperature of not higher than about 150° C., wherein said polyisocyanate is polymethylene polyphenyl isocyanate.

2. The resin composition for cationic electrodeposition coating according to claim 1 wherein the resin having cationic groups (A) is a cationic amine-modified epoxy resin which is prepared by reacting an amine with an epoxy resin obtained by the reaction of glycidyl ether of polyphenol and glycidyl ether of diol with a polyphenol.

3. The resin composition according to claim 1, wherein 5–55% of the isocyanate groups are polymerized with said polyol.

4. The resin composition according to claim 3, wherein the 10–30% of the isocyanate groups are polymerized with said polyol.

5. The resin composition according to claim 1, wherein the portion of the blocking agent (1) is 10–60% by weight, based on the total amount of blocking agents (1) and (2).

6. The resin composition according to claim 5, wherein the portion of the blocking agent (1) is 15–50% by weight, based on the total amount of blocking agents (1) and (2).

7. The resin composition according to claim 1, wherein the weight ratio of the epoxy resin (A) to the blocked polyisocyanate (B), expressed as A/B, is in the range 90/10 to 40/60.

8. The resin composition according to claim 7, wherein the ratio of (A) to (B) is in the range 85/15 to 50/50.

9. The resin composition according to claim 8, wherein the ratio of (A) to (B) is in the range 80/20 to 55/45.

10. The resin composition according to claim 1, further comprising at least one member selected from a coloring pigment, a body pigment, an anticorrosive pigment, a defoamer, an anti-cratering agent or a curing catalyst.

* * * * *